United States Patent
Johnsen et al.

(10) Patent No.: US 6,570,978 B1
(45) Date of Patent: May 27, 2003

(54) METHOD FOR IMPROVING A NETWORK STRUCTURE, ESPECIALLY AN IN (INTELLIGENT NETWORK) NETWORK STRUCTURE

(75) Inventors: Petter Johnsen, Arendal (NO); Vidar Timenes Tjore, Arendal (NO); Geir Olav Evensen, Nedenes (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 09/655,819

(22) Filed: Sep. 6, 2000

Related U.S. Application Data

(63) Continuation of application No. PCT/NO99/00069, filed on Mar. 2, 1999.

(30) Foreign Application Priority Data

Mar. 6, 1998 (NO) .......................................... 19980972

(51) Int. Cl.⁷ ............................ H04M 7/00; H04M 3/42
(52) U.S. Cl. ........................ 379/221.08; 379/207.02; 379/229
(58) Field of Search ................. 379/201.01–201.05, 379/207.02, 221.08–221.12, 229, 230, 211.02

(56) References Cited

U.S. PATENT DOCUMENTS

| | | | |
|---|---|---|---|
| 5,206,899 A | 4/1993 | Gupta et al. ................ | 379/120 |
| 5,251,255 A | 10/1993 | Epley ........................ | 379/242 |
| 5,255,264 A | 10/1993 | Cotton et al. ................ | 370/286 |
| 5,337,351 A | 8/1994 | Manabe et al. ......... | 379/201.02 |
| 5,379,383 A * | 1/1995 | Yunoki ...................... | 379/242 |
| 5,386,464 A | 1/1995 | Pruitt ..................... | 379/201.03 |
| 5,457,736 A | 10/1995 | Cain et al. .................. | 455/439 |
| 5,519,772 A | 5/1996 | Akman et al. ......... | 379/221.08 |
| 5,530,742 A | 6/1996 | Taylor et al. .......... | 379/221.11 |
| 5,530,931 A | 6/1996 | Cook-Hellberg et al. ..................... | 379/211.03 |
| 5,533,115 A | 7/1996 | Hollenbach et al. ... | 379/221.11 |
| 5,537,466 A | 7/1996 | Taylor et al. .......... | 379/221.11 |
| 5,544,236 A | 8/1996 | Andruska et al. ...... | 379/201.02 |
| 5,572,583 A * | 11/1996 | Wheeler et al. ........ | 379/221.09 |
| 5,574,780 A | 11/1996 | Andruska et al. ...... | 379/221.09 |
| 5,761,290 A * | 6/1998 | Farris et al. ................ | 379/219 |
| 6,044,264 A * | 3/2000 | Huotari et al. .............. | 455/414 |
| 6,141,545 A * | 10/2000 | Begeja et al. .......... | 379/211.02 |

FOREIGN PATENT DOCUMENTS

| | | |
|---|---|---|
| GB | 2 301 983 A | 12/1996 |
| WO | WO 95/24011 | 9/1995 |
| WO | WO 96/13927 | 5/1996 |

\* cited by examiner

*Primary Examiner*—Benny Q. Tieu
(74) *Attorney, Agent, or Firm*—Nixon & Vanderhye P.C.

(57) ABSTRACT

The present invention relates to a method for improving a network structure, especially an IN (Intelligent Network) network structure and the multi-feature services thereof, and for the objective to provide easier customizing and tailoring of the services to different customers in connection with such multi-feature services, and in order to more easily address such different features, it is according to the present invention suggested a method which his characterized by letting each feature within the service be assigned a unique number, a so-called feature key.

10 Claims, 2 Drawing Sheets

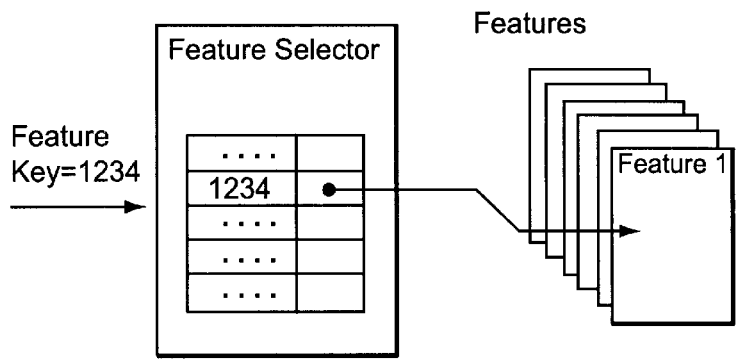
Fig. 1 Concept of feature key and feature selector.
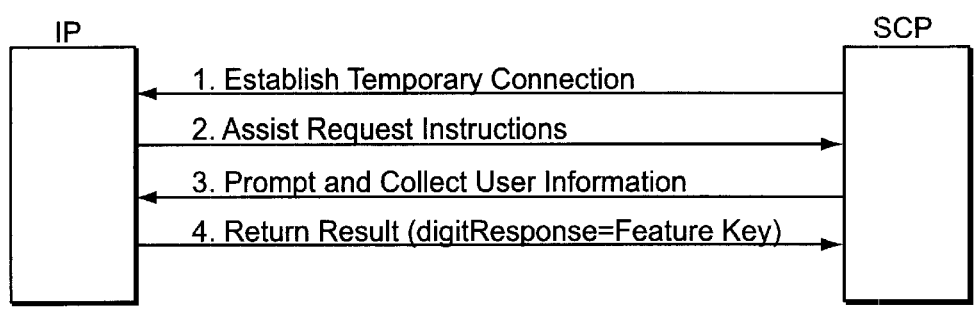
Fig. 2 Simplified figure of IP-SCP communication when IP initiating execution of a feature in the SCP.

METHOD FOR IMPROVING A NETWORK STRUCTURE, ESPECIALLY AN IN (INTELLIGENT NETWORK) NETWORK STRUCTURE

This is a continuation of PCT application No. PCT/NO99/00069, filed Mar. 2, 1999, the entire content of which is hereby incorporated by reference in this application.

FIELD OF THE INVENTION

The present invention relates to a method for improving a network structure, especially an IN (Intelligent Network) network structure and the multi feature services thereof.

BACKGROUND OF THE INVENTION

Most of the IN Services designed today comprise services that can be customised and provide different features to different customers. This is usually multi feature services. The multi feature services will be subject to continuously changes and from this emerges the need for a fast and flexible way of introducing new versions of the features, and customising of the complete service.

Intelligent Networks are a telecommunication network architecture aimed at offering new telecommunication services in a fast, and flexible and cost effective way. The core of an Intelligent telecommunications Network consists of a Service Switching Point (SSP) which is a switching system that can intercept telephone calls and query a Service Control Point (SCP), which is a system containing service specific logic and data that will allow it to return instructions to the SSP on how to further treat the intercepted call.

This core of the Intelligent Network will take care of the basic call handling. If the service needs some kind of special functionality (this could be functionality for playing announcements and receiving digits and so on) the service will connect to an external device, an IP/SRF, providing the needed functionality.

On this Intelligent Networks platform multi feature services are implemented. The user of the service will access this feature through a user interface. The SCP has limitations regarding to which technology the user interface can be provided (the standard SCP/SSP will only support a DTMF interface). For this reason user interfaces might be provided by external devices (IP/SRF) providing the needed technology (this could be devices providing technology for speech recognition or access to the service from a PA).

Problems Related to Prior Art

Most of the services used today uses a DTMF interface. If more sophisticated interfaces are to be provided, external IP providing the needed technology has to be connected. This will often result in that the service has to be updated and adjusted for this kind of technology and user interface.

By defining an interface against the IP providing the user interface technology, the service could be made independent of the actual technology used. In this way the user interface could easily be changed by connecting to a different IP.

Further Prior Art

U.S. Pat. No. 5,537,466 (Tayler et al.) relates to an Intelligent communications Network, which controls the communication such as to provide diagrams illustrating how the telephone calls are processed. Such diagrams comprise tables which in turn comprise service keys and specific telephone data.

U.S. Pat. No. 5,379,383 (Yunoki) discloses a communication service control system in an Intelligent Network providing a service applicator storing data comprising programme component numbers indicating the type of services. The service application unit comprises service keys.

U.S. Pat. No. 5,251,255 (Epley) discloses a method for controlling the processing of telephone calls from feature processors, which are data bases which are shared between a number of switching systems.

U.S. Pat. No. 5,530,931 (Cook-Hellberg et al.) discloses a method and apparatus for providing a look ahead feature of an enhanced call forwarding in a telephone call in a telephone communications system. The prior art suggest tables regarding the features and discloses how these features are processed.

U.S. Pat. No. 5,457,736 (Cain et al.) discloses a system and method for providing micro cellular Personal Communications Services (PCS) through the use of DRPC architecture. Said PCS services comprise a data base which is used for storing UPT numbers which have been assigned to PCS users.

U.S. Pat. No. 5,386,464 (Pruitt) discloses a method for implementing telecommunications features in switches comprising a memory means and a plurality of system conditions. The features are controlled by its own feature programme which is executed in the memory means of the switches.

U.S. Pat. No. 5,574,780 (Andruska et al.) discloses a method for controlling telephone call features which are supplied to a user from a hierarchical telecommunication switch. U.S. Pat. No. 5,337,351 (Manabe et al.) discloses a control unit, i.e. a Feature Interaction Arbitrator (FIA) which identifies and controls the interaction among various telephone call features, said prior art suggesting tables illustrating the properties of such elements.

Further, the applicant is aware of the following patent publications WO 95/24011 (Telescan/Carlin et al.), U.S. Pat. No. 5,206,899 (Gupta et al.), WO 96/13927 (LM Ericson/Iapalucci et al.), U.S. Pat. No. 5,255,264 (Cotton et al.), U.S. Pat. No. 5,519,772 (Akman et al.), U.S. Pat. No. 5,530,742 (Taylor et al.), U.S. Pat. No. 5,572,583 (Wheeler, Jr. et al.), U.S. Pat. No. 5,533,115 (Hollenbach et al.), as well as applicant's own Swedish patent applications: 97-272405 (3.11.95) Call bach subscriber feature providing system within communications network. 95-275585 (31.1.94) Network-based telephone system containing interactive facilities. 97-045167 (23.6.95) Subscriber interaction method for intelligent network. 97-045166 (23.6.95) Subscriber interaction method for intelligent network. 96-333569 (13.10.94) Advanced intelligent network subscriber specific message recording.

OBJECTS OF THE INVENTION

A main object of the present invention is to provide a method for improving a network structure and the multi feature services thereof.

Another object of the present invention is to provide such a method whereby the different features thereof can be put together in a more flexible way.

Still another object of the present invention is to provide services with a different user interface than standard DTMF interaction, possibly by involving the use of external devices.

More specifically, an object of the present invention is to present a more flexible way to address different features in multi feature services and the interface and information transferred between an external device.and the IN service, especially when addressing features within the service from any external device.

Still another object of the present invention is to provide a method wherein the service could be made independent of the actual technology used.

Yet another object of the present invention is to provide a method wherein the user interface could easily be changed by connecting to different IPs.

SUMMARY OF THE INVENTION

The above objects are achieved in a method as claimed in the preamble, which according to the invention is characterized by the characterizing clause of the appending patent claim 1.

Further features and advantages of the present invention will appear from the following description taken in conjunction with the enclosed Figures, as well as from the further enclosed patent claims.

BRIEF DISCLOSURE OF THE DRAWINGS

Embodiments of the present invention will now be described, reference being had to the enclosed drawing in which:

FIG. 1 is a block diagram illustrating the concept of feature key and feature selector.

FIG. 2 is a simplified sketch of IP-SCP communication when IP initiating execution of a feature in the SCP.

DETAILED DESCRIPTION OF EMBODIMENTS

Figure 3:
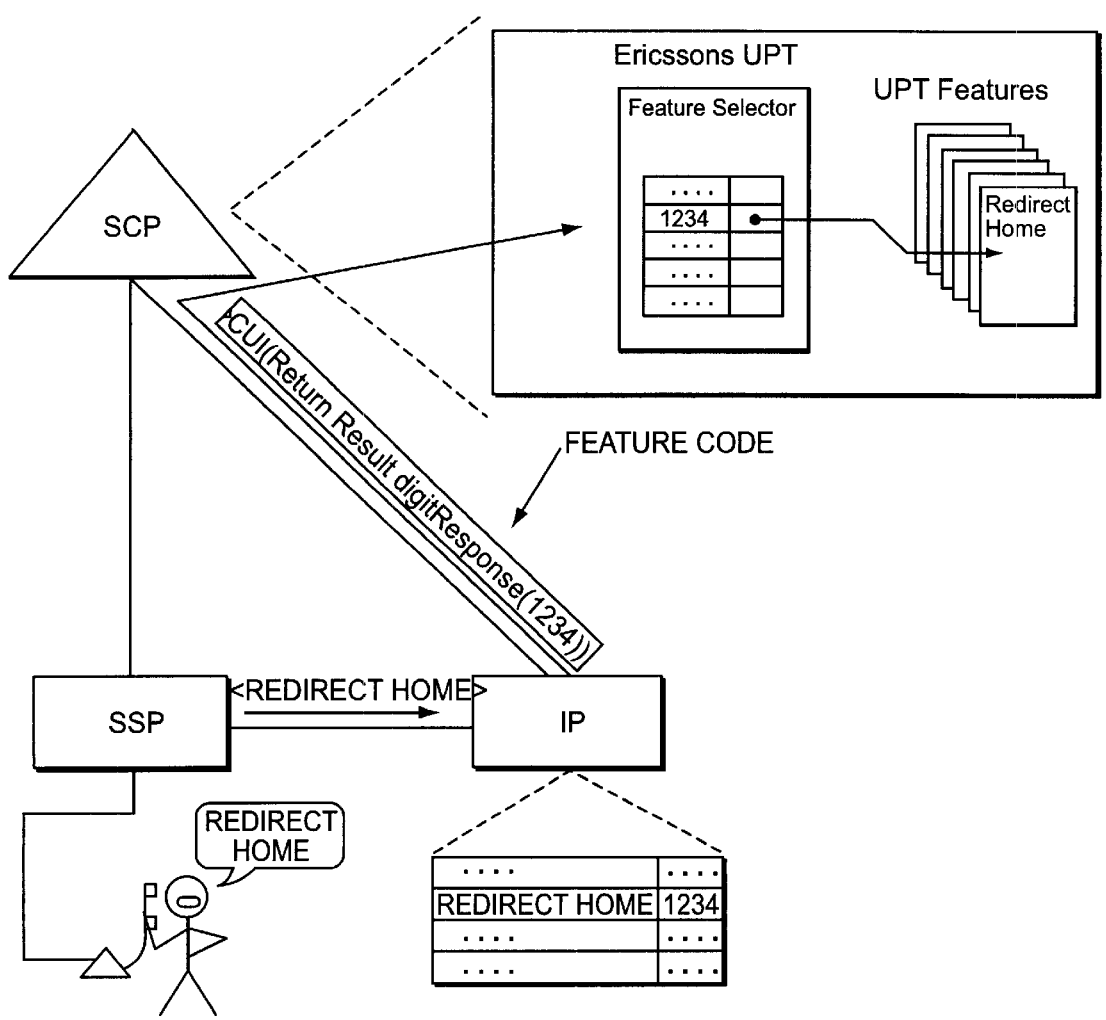
FIG. 3 is a block diagram illustrating a call scenario related to UPT service, wherein a specific feature thereof is executed according to the present invention.

The invention describes how features (sub-services) in multi feature services can be addressed and how an external device like an IP/SRF address(es) features within a multi feature service.

Services may consist of many different features. In this invention, each feature within any service are assigned a unique number, called Feature Key. When a feature is to be executed, the feature's Feature Key is sent to a service called a feature selector. The Feature selector will from the Feature Key identify the correct feature and execute it, see FIG. 1.

When an external IP/SRF shall be used by the service, the protocol used for information exchange between the IP and the SCP could be CS1. If the IP wants to initiate execution of a specific feature, the feature's Feature Key (and possible feature input) will be signalled back to the service by CS1 operations, see FIG. 2. The Feature Key will then be sent to the Feature Selector, and the feature will be executed.

This concept can be used to provide services with new user interfaces. An IP providing the technology for the wanted user interface is set up in the network. This IP will handle the user interaction, i.e. welcome the user to this and this service, guide the user through possible menu structures, identify which features the user wants to execute, and collect possible input for this feature and so on.

The service will be triggered as usual, for instance by a user dialling a specific B-number. The triggered service will then connect an IP providing the wanted user interface (1. and 2. on FIG. 2). The service then initiates the execution of the user interaction on the IP (3. in FIG. 2). The IP will then initiate the dialogue with the user, and in the mean time the service will await a result from the IP. The dialogue between the user and the IP will continue until the IP decides that it has collected enough information to start a feature in the service running on the SCP. The IP will then send the Feature Key identifying the feature that is to be executed back to the service (4. in FIG. 2), together with possible feature input/data. The Feature Selector will then filter out the Feature Key and execute the correct feature.

When this concept is used for the user interfaces, change of user interface in a service is very easy as this only involves connecting to a different IP.

Call Scenario

As an example of a call scenario we will use Ericsson's UPT service, as this is illustrated in FIG. 3. This is a multi feature service, and it will use speech recognition as one possible user interface:

You subscribe to Ericsson's UPT Service, which supports speech recognition. You are arriving home and want to redirect all you incoming UPT calls to your home terminal. You access the service by dialling the UPTAN. The service then sets up a temporary connection to the speech recognition IP, to provide you with the desired user interface. The service then sends a Prompt and Collect User Information (PCUI) to the IP to initiate the user interaction, which then plays a welcome announcement and you may then give your commands. Then you say <REDIRECT> <HOME>. The IP identifies this as the UPT Feature 'Redirect all calls to the subscriber's home number', which e.g. is identified by the Feature Key 1234. The Feature Key 1234 is then sent to the service as the digitResponse parameter in Return Result for PCUI. The Feature Selector receives the Feature Key 1234 and identifies this as the feature 'Redirect all calls to the subscriber's home number' and the feature is executed. All incoming calls will now be redirected to your home terminal.

Advantages/Use Cases

Could be used when features within a service should be accessed/activated from external equipment like an IP.

Service can be made independent of the user interface.

The interface is independent of the technology used.

Easy to address new features (adding/moving pointers in Feature Selector).

The IP and the SCP is independent. Change of feature in one of the nodes can be done without influencing the other.

Broadening

This document concerns the communication between multi feature service and an IP providing a user interface. The implementation of the invention may comprise other kinds of equipment that may be used together with multi feature service.

The operations used in this document is CS1 operations. The inventive idea may, however, cover for future and other Intelligent Network protocols.

Abbreviation and terminology

| Abbreviation and terminology | |
| --- | --- |
| IN | Intelligent Networks |
| IP | Intelligent Peripheral |

-continued

| Abbreviation and terminology | |
|---|---|
| SCP | Service Control Point |
| SSP | Service Switching Point |
| UPT | Universal Personal Telecommunication |
| PCUI | Prompt and Collect User Information |
| SRF | Special Resource Function |
| DTMF | Dual Tone Multi Frequency |
| PA | Personal Assistant |
| CS1 | Capability Set 1 |
| UPTAN | |

What is claimed is:

1. A method for making multi-feature services in an IN (Intelligent Network) network structure available for a user, the method comprising:

assigning each sub-service of a multi-feature service a different sub-service identifier represented by a unique number so as to represent a function address for the sub-service in question, so that each of the sub-services of the multi-feature service is assigned a different sub-service identifier;

an external device and a service control point (SCP) related to the multi-feature service establishing communication with each other, and thereafter the external device sending one of a plurality of possible sub-service identifiers to a service designated feature selector via at least the SCP in order to access the specific sub-service to which the one sub-service identifier is assigned; and said feature selector causing the sub-service to which the one sub-service identifier is assigned to be executed based upon reception of the one sub-service identifier from the external device.

2. Method as claimed in claim 1, wherein an external IP (Intelligent Peripheral)/SFR (Special Resource Function) is the external device, and the protocol used for information exchange between said IP and the SCP (Service Control Point) is CS1 (Capability Set 1).

3. Method as claimed in claim 2, characterized in that when an external IP wants to initiate execution of a specific sub-service, then a feature key including the sub-service identifier is signaled back to the service by said CS1 operation, said feature key then being sent to said feature selector for execution of the sub-service in question.

4. Method as claimed in claim 1, wherein in the external device there is set up technology for the wanted user interface so as to handle the user intersection, comprising many structures, features available throughout, and input means for the execution thereof.

5. Method as claimed in claim 1, wherein a service is triggered by dialing a specific B-number, for letting the triggered service be connected to an external device IP providing the wanted user interface and thereafter letting said service initiate execution of the user interaction on said IP.

6. Method as claimed in claim 5, characterized in that after finishing dialog between the user and said IP, said IP will start a sub-service in the service running on said SCP, and then said IP will send an associated feature key including the assigned sub-service identifier back to the service together with sub-service input/data, at which time said feature selector will filter out said feature key and execute the correct sub-service.

7. Method as claimed in claim 1, wherein a change of user interface in a service is effected by connection to a different external device IP.

8. Method as claimed in claim 1, wherein in connection with a UPT (Universal Personal Telecommunication) Service supporting speech recognition, access to a service in question is effected by the user dialing the UPTAN, said service thereafter setting up a temporary connection to the speech recognition IP for the provision of necessary user interface, and then said service sends a PCUI (Prompt and Collect User Information) to the IP to initiate user interaction, and a user message command is identified by said IP as the UPT sub-service in question.

9. Method as claimed in claim 8, wherein a user message command initiated feature key is sent to the service as a digit-response parameter in Return Result for said PCUI for the feature selector to execute said commanded feature.

10. A method for making multi-feature services in an IN (Intelligent Network) network structure available for a user, the method comprising:

assigning each sub-service of a multi-feature service a different sub-service identifier represented by a unique number so as to represent a function address for the sub-service in question, so that each of the sub-services of the multi-feature service is assigned a different sub-service identifier;

an external device and a service control point (SCP) related to the multi-feature service establishing communication with each other, and thereafter the external device sending one of a plurality of possible sub-service identifiers to at least a service designated feature selector in order to access the specific sub-service to which the one sub-service identifier is assigned; and said feature selector causing the sub-service to which the one sub-service identifier is assigned to be executed based upon reception of the one sub-service identifier from the external device.

* * * * *